(12) United States Patent
Kim et al.

(10) Patent No.: US 8,687,581 B2
(45) Date of Patent: Apr. 1, 2014

(54) METHOD AND DEVICE FOR SENDING AND RECEIVING CONTROL DATA ON A WIRELESS COMMUNICATIONS SYSTEM

(75) Inventors: So Yeon Kim, Anyang-si (KR); Jae Hoon Chung, Anyang-si (KR); Yeong Hyeon Kwon, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 144 days.

(21) Appl. No.: 13/381,478

(22) PCT Filed: Jul. 9, 2010

(86) PCT No.: PCT/KR2010/004493
§ 371 (c)(1),
(2), (4) Date: Dec. 29, 2011

(87) PCT Pub. No.: WO2011/005058
PCT Pub. Date: Jan. 13, 2011

(65) Prior Publication Data
US 2012/0188959 A1 Jul. 26, 2012

Related U.S. Application Data

(60) Provisional application No. 61/224,456, filed on Jul. 9, 2009.

(51) Int. Cl.
*H04W 72/04* (2009.01)
(52) U.S. Cl.
USPC ........................................... 370/329

(58) Field of Classification Search
USPC .............. 370/329, 206, 302, 310.2, 326, 328, 370/334, 336; 455/73, 522, 423, 552.1
See application file for complete search history.

(56) References Cited

U.S. PATENT DOCUMENTS

| | | | |
|---|---|---|---|
| 8,437,798 B2 * | 5/2013 | Fabien et al. | 455/552.1 |
| 2007/0167181 A1 | 7/2007 | Ramesh et al. | |
| 2010/0227569 A1 * | 9/2010 | Bala et al. | 455/73 |
| 2010/0297993 A1 * | 11/2010 | Heo et al. | 455/423 |
| 2010/0331037 A1 * | 12/2010 | Jen | 455/522 |
| 2011/0096734 A1 * | 4/2011 | Damnjanovic et al. | 370/329 |

FOREIGN PATENT DOCUMENTS

KR 10-2009-0071784 A 7/2003

* cited by examiner

*Primary Examiner* — Kwang B Yao
*Assistant Examiner* — Syed M Bokhari
(74) *Attorney, Agent, or Firm* — Birch, Stewart, Kolasch & Birch, LLP

(57) ABSTRACT

The present invention relates to a method and device for sending and receiving control data on a wireless communications system employing an aggregated carrier arrangement. In a method for transmitting control data on a wireless communications system supporting carrier aggregation according to one aspect of the present invention, a base station transmits, to a mobile station, information relating to physical cell ID (physical cell identification, hereinafter "PCI") for use in uplink signal transmission, and receives an uplink signal generated from the mobile station using the PCI.

12 Claims, 11 Drawing Sheets

FIG. 3
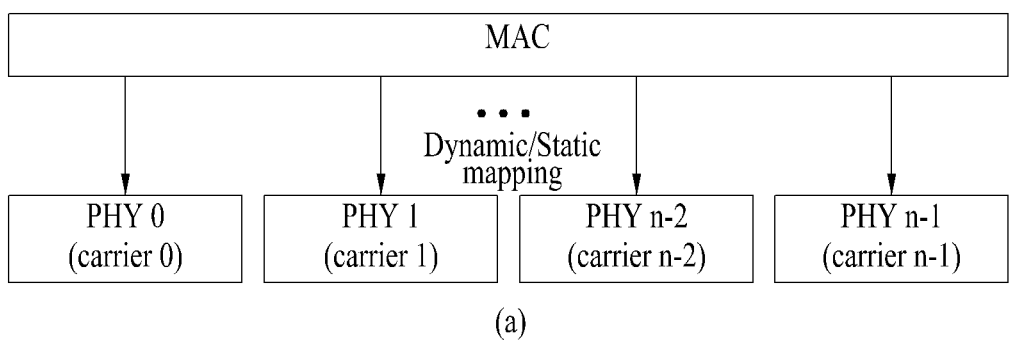
(a)
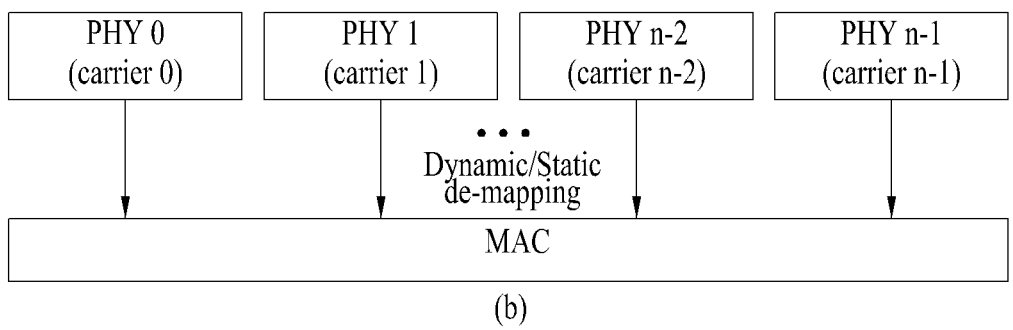
(b)

FIG. 4
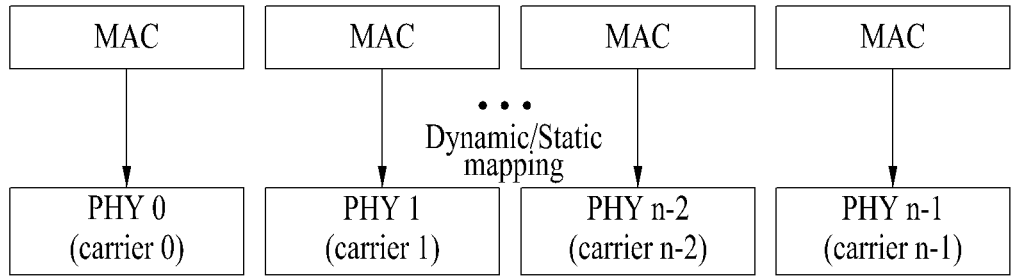
(a)
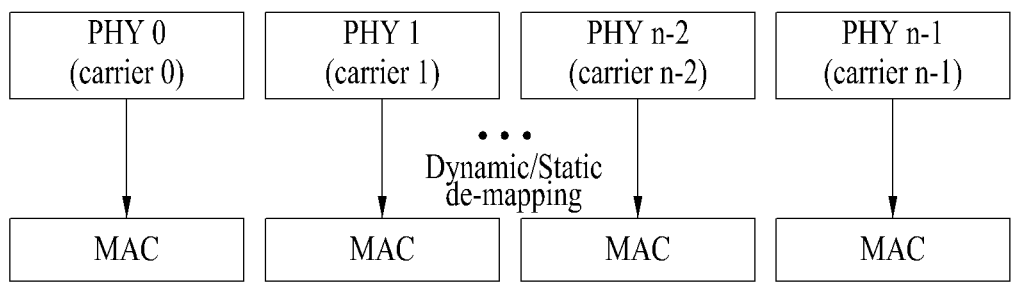
(b)
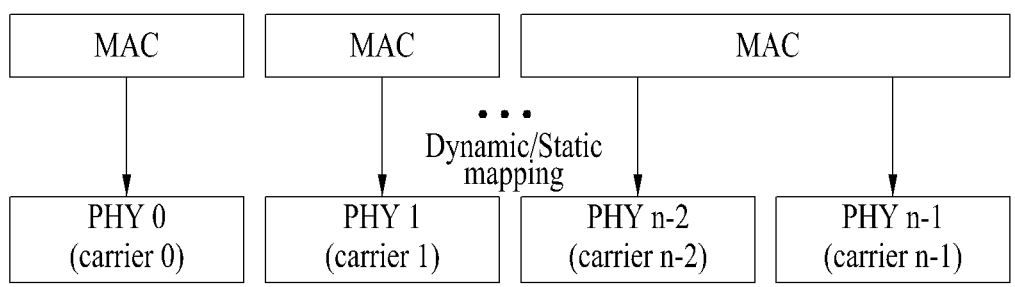
(c)
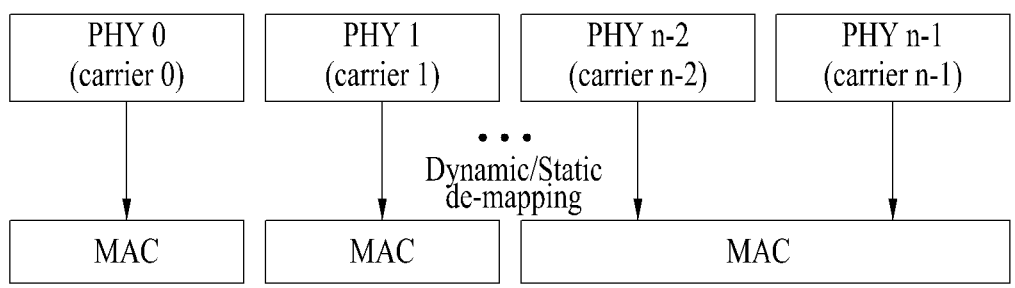
(d)

FIG. 7
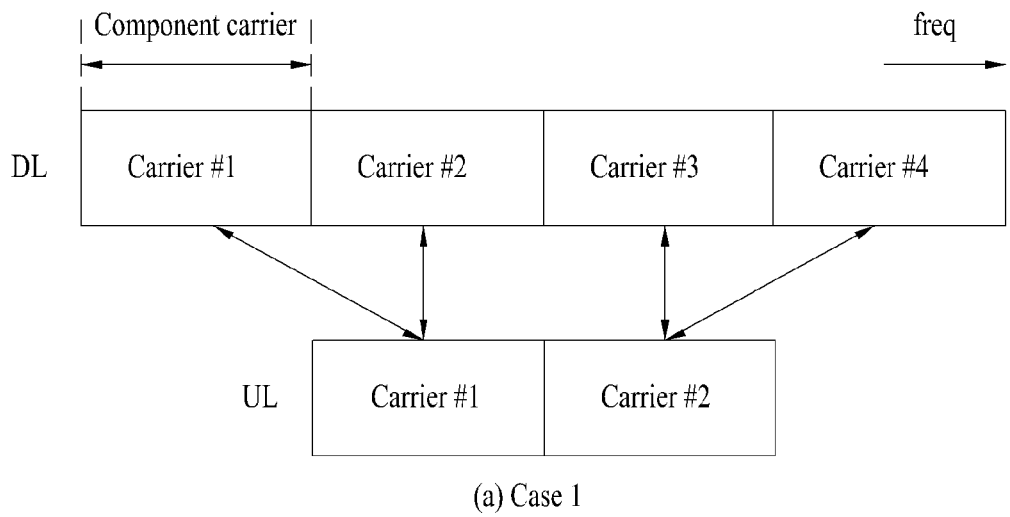
(a) Case 1
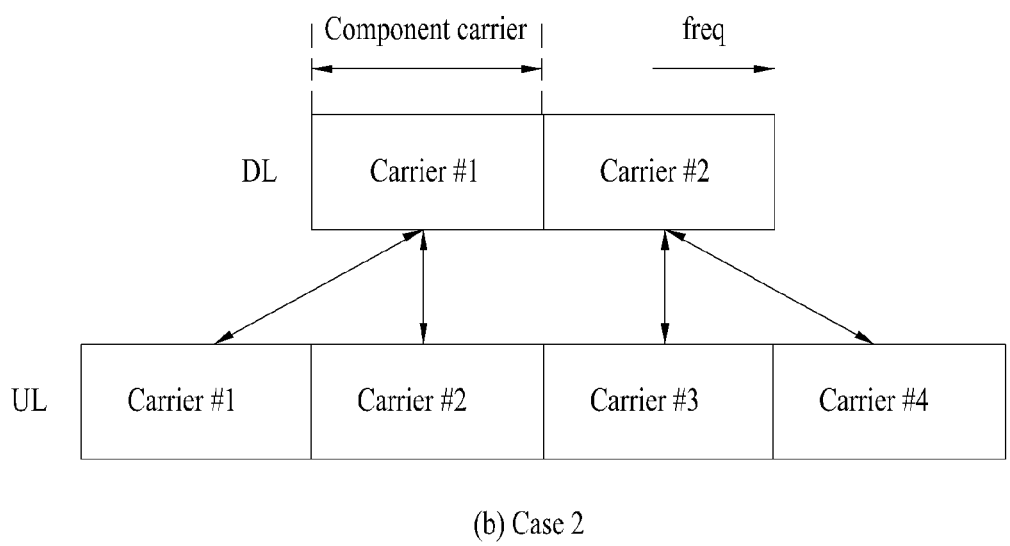
(b) Case 2

FIG. 8
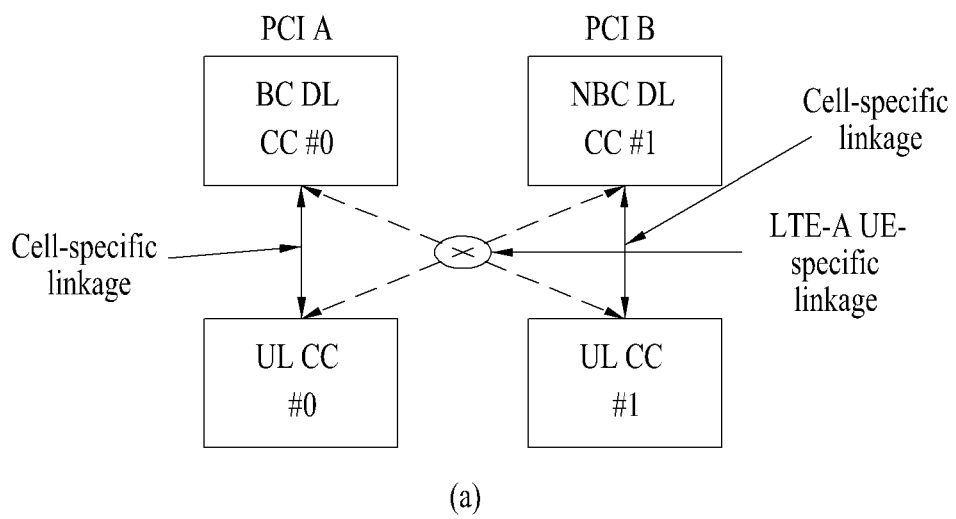
(a)
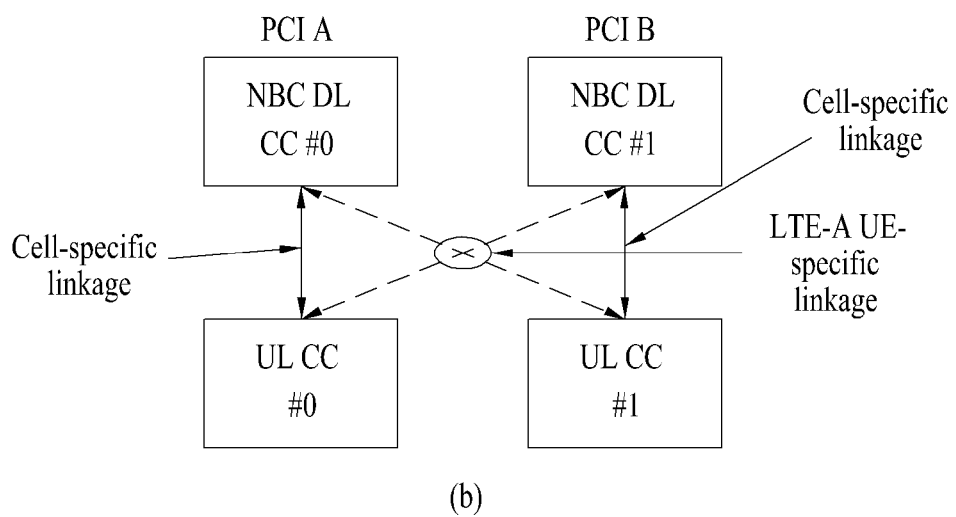
(b)

FIG. 9
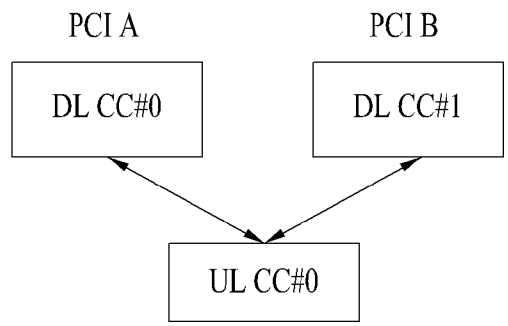
(a)
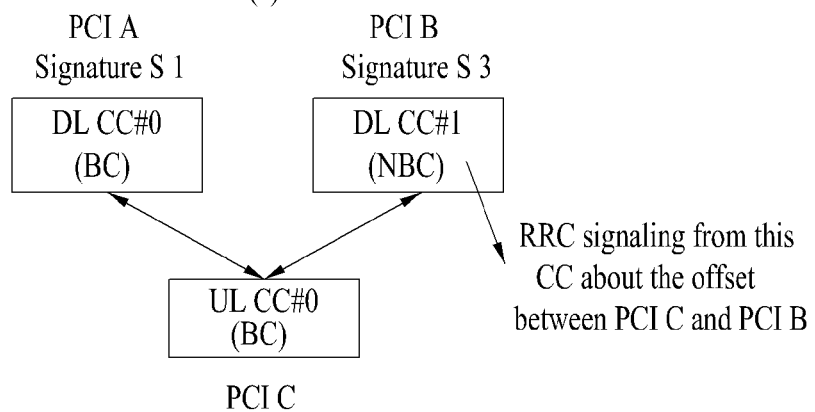
(b)
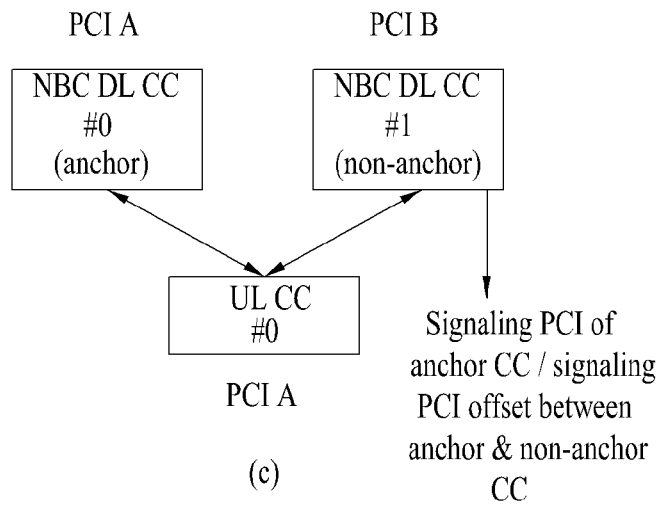
(c)

FIG. 10
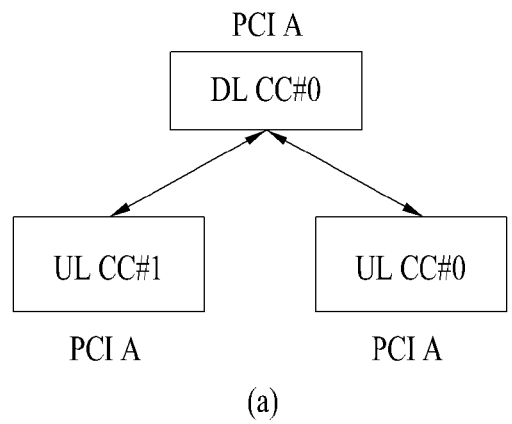
(a)
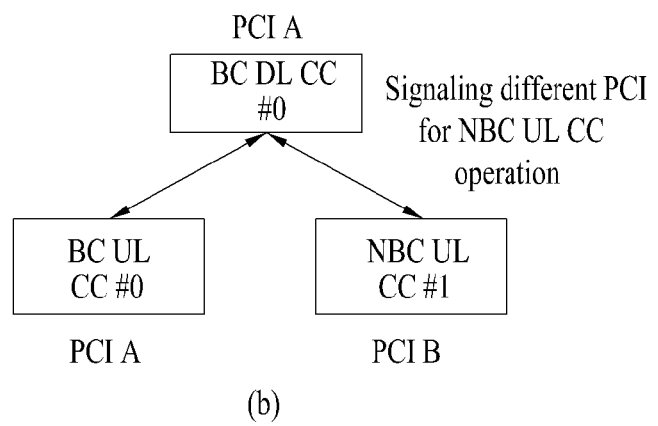
(b)
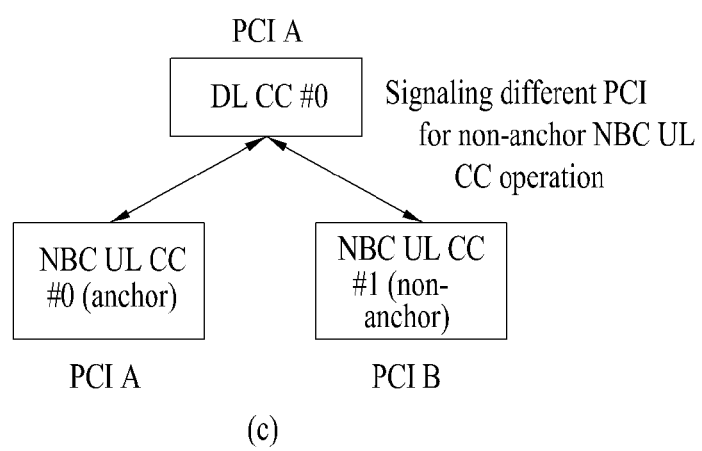
(c)

US 8,687,581 B2

METHOD AND DEVICE FOR SENDING AND RECEIVING CONTROL DATA ON A WIRELESS COMMUNICATIONS SYSTEM

CROSS REFERENCE TO RELATED APPLICATIONS

This application is the National Phase of PCT/KR2010/004493 filed on Jul. 9, 2010, which claims priority under 35 U.S.C. 119(e) to U.S. Provisional Application No. 61/224,456 filed on Jul. 9, 2009, all of which are hereby expressly incorporated by reference into the present application.

TECHNICAL FIELD

The present invention relates to a wireless communications system, and more particularly, to a method and apparatus for transmitting and receiving information in a wireless communications system to which carrier aggregation is applied.

BACKGROUND ART

First of all, a frame structure and a resource structure of a wireless communications system will be described with reference to FIG. 1 and FIG. 2. FIG. 1 is a diagram illustrating a frame structure of a wireless communications system. As shown in FIG. 1, one frame includes ten subframes, each of which includes two slots. The time required to transmit one subframe will be referred to as a transmission time interval (hereinafter, referred to as "TTI"). For example, one subframe may be 1 ms, and one slot may be 0.5 ms.

One slot includes a plurality of orthogonal frequency division multiplexing (OFDM) symbols. The OFDM symbols may be referred to as SC-FDMA symbols or symbol duration.

One slot includes seven or six OFDM symbols in accordance with a length of cyclic prefix (hereinafter, referred to as "CP"). A long term evolution (hereinafter, referred to as "LTE") system includes a normal CP and an extended CP. One slot includes seven OFDM symbols if a normal CP is used, while one slot includes six OFDM symbols if an extended CP is used. The extended CP is used if delay spread is great.

FIG. 2 is a diagram illustrating a resource structure of one downlink slot. Referring to FIG. 2, one slot includes seven OFDM symbols. A resource element (RE) is a resource region that includes one OFDM symbol and one subcarrier, and a resource block (RB) is a resource region that includes a plurality of OFDM symbols and a plurality of subcarriers. For example, the resource block may include seven OFDM symbols in a time domain, and may include twelve subcarriers in a frequency domain. The number of resource blocks included in one slot may be determined depending on a downlink bandwidth.

At present, an LTE-A system of which standardization is in progress supports carrier aggregation. Carrier aggregation is intended to extend a bandwidth by grouping a plurality of carriers, thereby enhancing a data rate.

Multicarrier refers to all frequency bands used by a base station, and a component carrier means an element carrier constituting multicarrier. In other words, a plurality of component carriers constitute multicarrier through carrier aggregation.

The system may be configured to allow a plurality of component carriers to use either the same physical cell ID (hereinafter, referred to as "PCI") or different PCIS.

In the LTE Rel-8, since PCI related operations are performed based on PCI detected from downlink component carriers connected at 1:1, ambiguousness or confusion of the PCI related operations does not occur. However, if carrier aggregation is used, ambiguousness or interference may occur in the PCI related operations depending on whether PCIs of the plurality of component carriers are configured equally or differently and in accordance with connection relation between downlink component carriers and uplink component carriers.

DISCLOSURE

Technical Problem

As described above, according to the related art, a problem occurs in that ambiguousness occurs in PCI related operations if carrier aggregation is used.

Accordingly, the present invention has been devised to obviate one or more problems due to limitations and disadvantages of the related art, and an object of the present invention is to provide a method for transmitting and receiving information, in which ambiguousness of PCI related operations can be removed from a system to which carrier aggregation is applied.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for transmitting control information from a base station of a wireless communications system supporting carrier aggregation comprises the steps of transmitting information on physical cell ID (physical cell identification, hereinafter referred to as "PCI") for use in uplink signal transmission, to a user equipment; and receiving an uplink signal, which is generated using the PCI, from the user equipment.

To achieve these objects and other advantages and in accordance with the purpose of the invention, according to another aspect of the present invention, a method for receiving control information from a user equipment of a wireless communications system supporting carrier aggregation comprises the steps of receiving information on first PCI for use in uplink signal transmission, from a base station; and transmitting an uplink signal, which is generated using the first PCI, to the base station.

In this case, the user equipment may detect second PCI through a downlink component carrier, and the information on first PCI may be offset between the first PCI and the second PCI.

Also, if NBC DL CC and BC DL CC are aggregated by carrier aggregation and connected with one uplink component carrier (UL CC), the first PCI may be PCI of the BC DL CC.

Also, if NBC UL CC and BC UL CC are aggregated by carrier aggregation and connected with one downlink component carrier (DL CC), the first PCI may be the PCI for use in uplink signal transmission when the user equipment transmits an uplink signal through the NBC UL CC.

To achieve these objects and other advantages and in accordance with the purpose of the invention, according to still another aspect of the present invention, a base station of a wireless communications system supporting carrier aggregation comprises a Tx module transmitting information on physical cell ID (physical cell identification, hereinafter referred to as "PCI") for use in uplink signal transmission, to a user equipment; and an Rx module receiving an uplink signal, which is generated using the PCI, from the user equipment.

To achieve these objects and other advantages and in accordance with the purpose of the invention, according to further still another aspect of the present invention, a user equipment of a wireless communications system supporting carrier aggregation comprises an Rx module receiving information on first PCI for use in uplink signal transmission, from a base station; and a Tx module transmitting an uplink signal, which is generated using the first PCI, to the base station.

Advantageous Effects

According to the embodiments of the present invention, as the user equipment generates the uplink signal by using PCI received from the base station, ambiguousness of PCI related operations, which is caused by carrier aggregation, may be solved.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIG. 3(a) is a diagram illustrating a transmitting portion where a plurality of carriers are managed by one MAC, and FIG. 3(b) is a diagram illustrating a receiving portion where a plurality of carriers are managed by one MAC;

FIG. 4 is a diagram illustrating that a plurality of MACs control a plurality of component carriers;

FIG. 7 is a diagram illustrating carrier aggregation where a downlink and an uplink are asymmetrical to each other;

FIG. 8 is a diagram illustrating a method for transmitting control information in accordance with the embodiment of the present invention in case of symmetrical carrier aggregation;

FIG. 9 is a diagram illustrating a method for transmitting control information in accordance with the embodiment of the present invention in case of downlink heavy asymmetrical carrier aggregation;

FIG. 10 is a diagram illustrating a method for transmitting control information in accordance with the embodiment of the present invention in case of uplink heavy asymmetrical carrier aggregation.

BEST MODE FOR CARRYING OUT THE INVENTION

Figure 1:
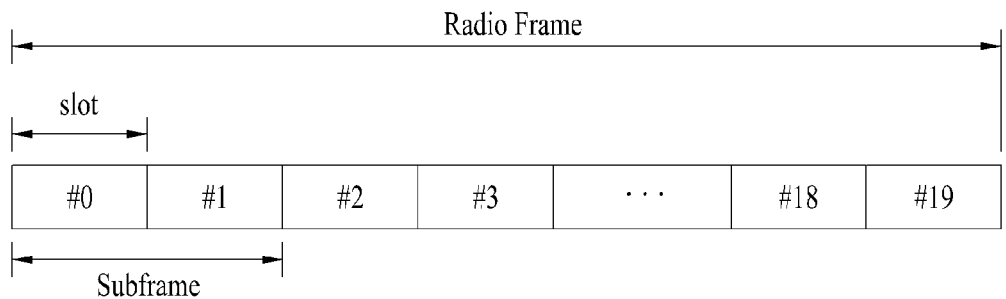
FIG. 1 is a diagram illustrating a frame structure of a wireless communications system.
Figure 2:
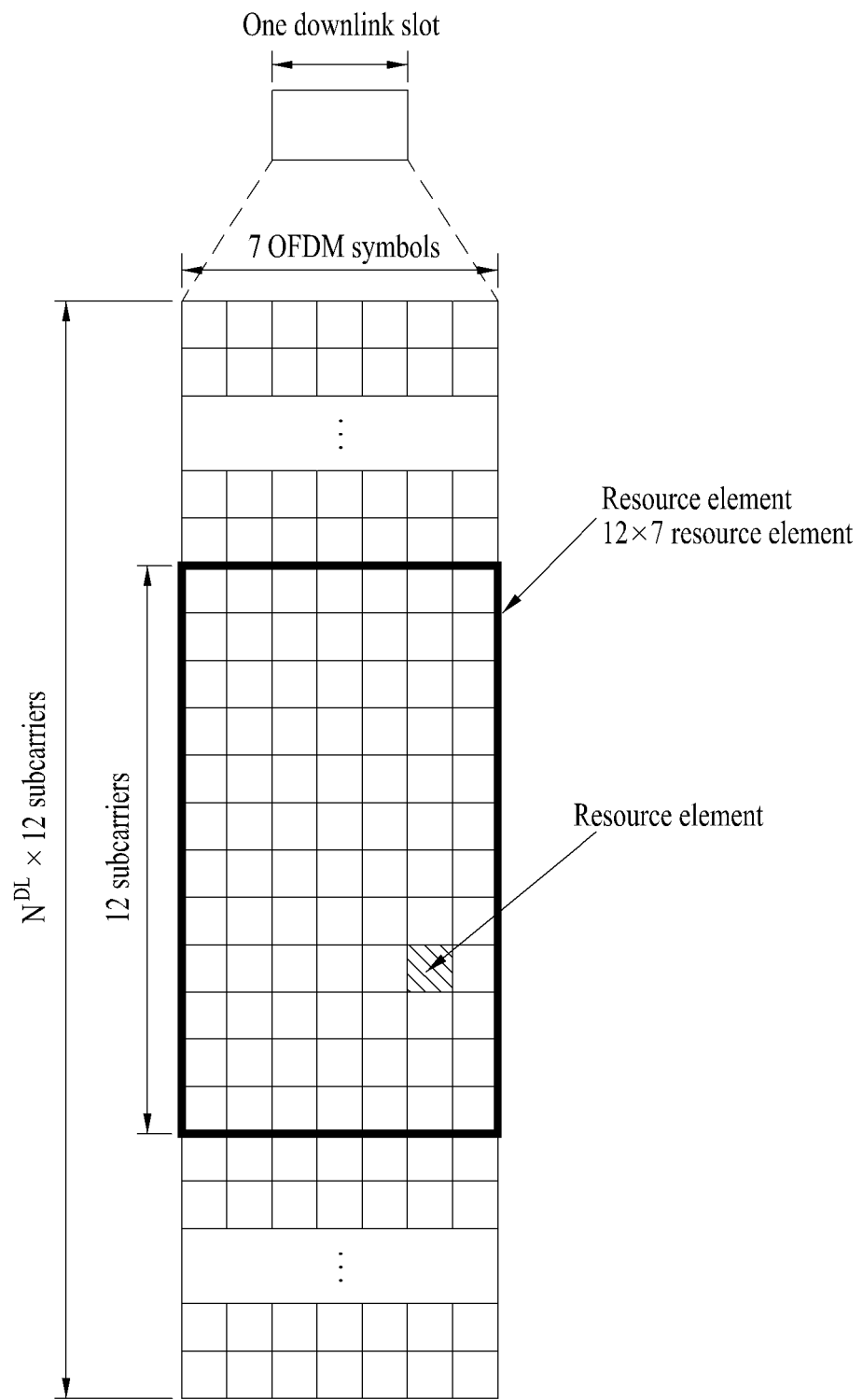
FIG. 2 is a diagram illustrating a resource structure of one downlink slot.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on that a mobile communication system is a 3GPP2 802.16 system, the following description may be applied to another random mobile communication system excluding particular features of the 3GPP2 802.16 system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a mobile terminal will refer to a mobile or fixed type user terminal device such as a user equipment (UE) and a mobile station (MS). Also, it is assumed that a base station will refer to a random node of a network terminal that performs communication with a mobile station, such as Node B (NB) and eNode B (eNB).

First of all, carrier aggregation will be described with reference to FIG. 3 and FIG. 4.

The environment considered by the embodiment of the present invention includes a general multicarrier support environment. In other words, a multicarrier system or carrier aggregation system specified in the present invention refers to a system that together uses one or more carriers having a bandwidth smaller than that of a target broadband when the target broadband is configured to support a broadband.

When one or more carriers having a bandwidth smaller than that of the target band are aggregated, a bandwidth of carriers aggregated for backward compatibility with the system according to the related art may be limited to a bandwidth used in the system of the related art. For example, since the 3GPP LTE system according to the related art supports bandwidths of 1.4, 3, 5, 10, 15 and 20 MHz, the LTE-A system supports a bandwidth greater than 20 MHz by using the bandwidths only of 1.4, 3, 5, 10, 15 and 20 MHz. Alternatively, the LTE-A system may support carrier aggregation by defining a new bandwidth regardless of the bandwidth used in the system according to the related art.

Multicarrier refers to a terminology that may be used together with carrier aggregation and bandwidth aggregation.

The technology that a plurality of carriers are managed by one MAC to efficiently use multicarrier will be described.

FIG. 3(a) is a diagram illustrating a transmitting portion where a plurality of carriers are managed by one MAC, and FIG. 3(b) is a diagram illustrating a receiving portion where a plurality of carriers are managed by one MAC. In this case, both a transmitter and a receiver should transmit and receive multicarrier to effectively transmit and receive the multicarrier to and from each other.

As shown in FIG. 3, one MAC transmits and receives one or more component carriers by managing and operating the component carriers. Since the component carriers managed by one MAC are not required to be contiguous to each other, it is advantageous in that the component carriers are managed and operated more flexibly in view of resource management. In other words, both continuous carrier aggregation and discontinuous carrier aggregation may be used.

Alternatively, a plurality of MACs may control a plurality of component carriers.

FIG. 4 is a diagram illustrating that a plurality of MACs control a plurality of component carriers.

As shown in FIG. 4(a) and FIG. 4(b), each of a plurality of MACs may control each of a plurality of component carriers 1:1. As shown in FIG. 4(c) and FIG. 4(d), some of the component carriers may be controlled by each of the plurality of MACs 1:1, and the other component carriers may be controlled by one MAC.

Carrier aggregation may be applied to both an uplink and a downlink. In case of a time division duplex (hereinafter, referred to as "TDD") system, a downlink signal and an uplink signal are transmitted through each of the plurality of carriers. In case of a frequency division duplex (hereinafter, referred to as "FDD"), a plurality of carriers may be used for each of the uplink and the downlink. Although bandwidths of the uplink and the downlink may be set differently from each other in the LTE Rel-8 system according to the related art, the LTE Rel-8 system according to the related art has basically supported transmission and reception within a single carrier. However, the LTE-A system may manage a plurality of carriers through carrier aggregation, and the FDD system may support asymmetrical carrier aggregation where the number of component carriers or the bandwidth of component carriers in the uplink is different from that in the downlink.

Figure 5:
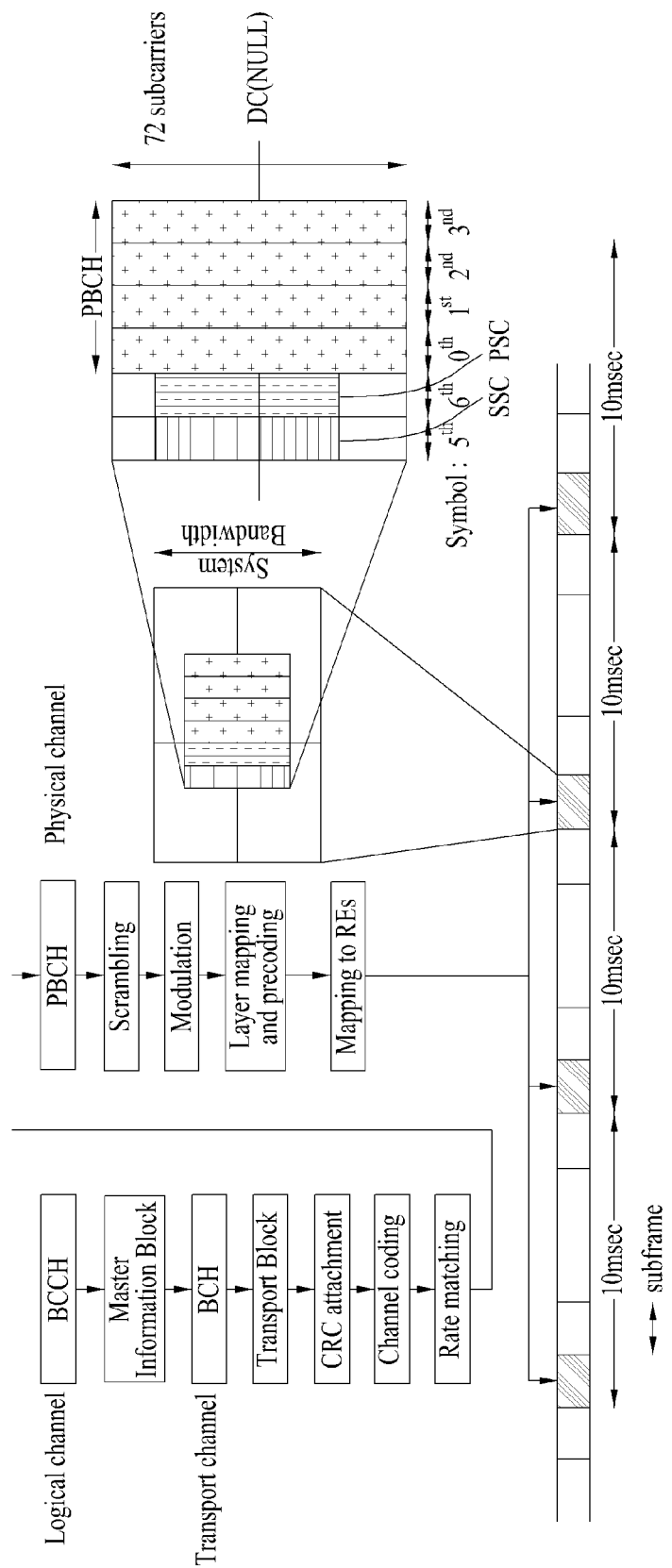
FIG. 5 is a diagram illustrating a synchronization signal and a broadcast channel in LTE Rel-8 system.

Next, a synchronization signal will be described. FIG. 5 is a diagram illustrating a synchronization signal and a broadcast channel in the LTE Rel-8 system, and FIG. 6 is a diagram illustrating a transmission structure of a synchronization signal in the LTE Rel-8 system.

In FIG. 5, a primary synchronization signal (hereinafter, referred to as "PSS") and a secondary synchronization signal (hereinafter, referred to as "SSS") are mapped into last two symbols of the first slot.

Figure 6:
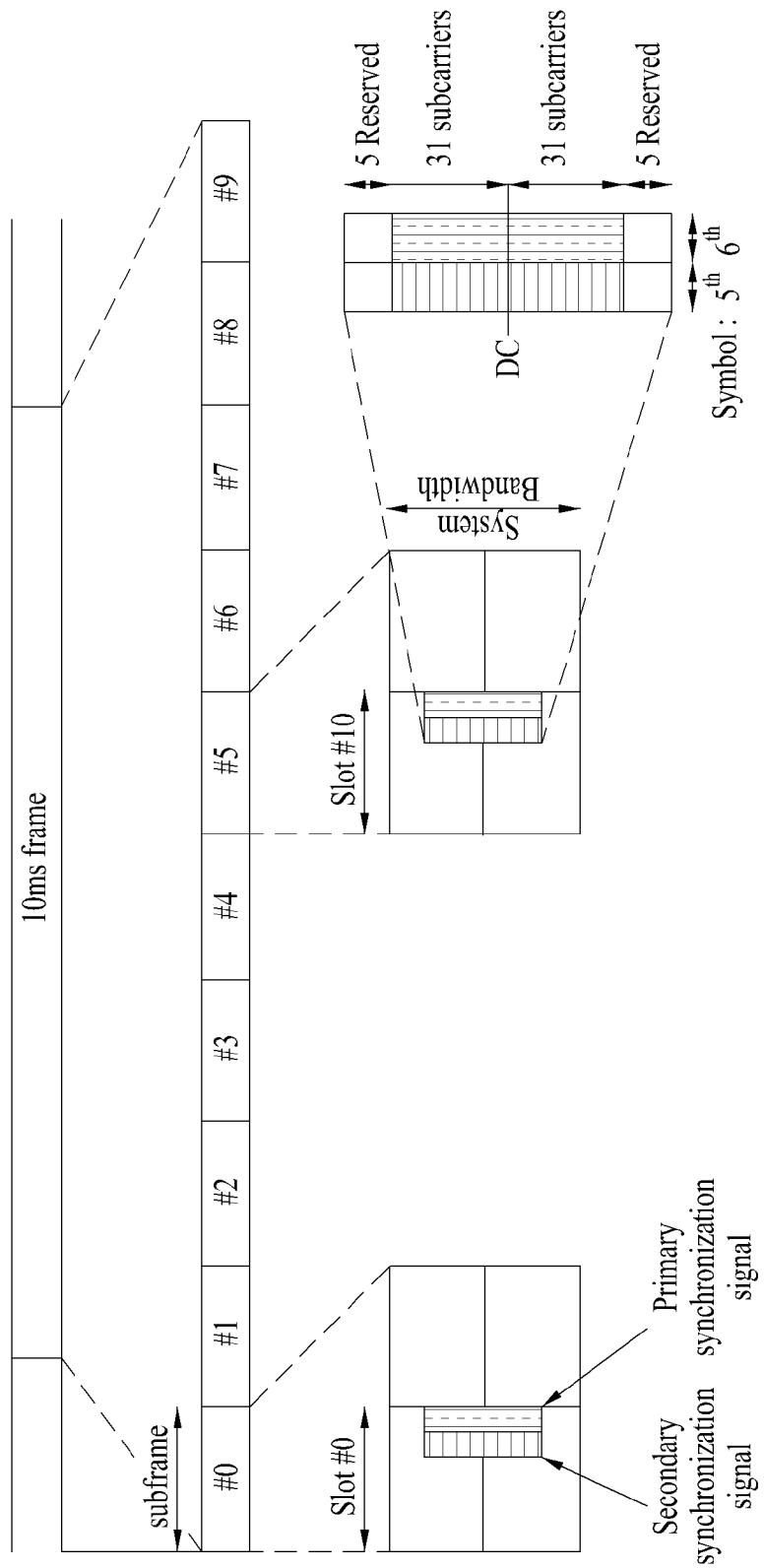
FIG. 6 is a diagram illustrating a transmission structure of a synchronization signal in LTE Rel-8 system.

Referring to FIG. 6, the PSS is transmitted using subcarriers at the last OFDM symbol of the first slot (slot 0) of the first subframe and the first slot (slot 10) of the sixth subframe of a frame of 10 ms. The SSS is transmitted using 72 subcarriers at the last second OFDM symbol of the first slot (slot 0) of the first subframe and the first slot (slot 10) of the sixth subframe of the frame of 10 ms. 10 subcarriers of 72 subcarriers are reserved, and the other 62 subcarriers transmit synchronization signal related information.

The user equipment performs cell search by using the PSS and the SSS. Cell search is performed to synchronize time and frequency with a cell and obtain physical cell identification (hereinafter, referred to as "PCI") of a corresponding cell.

The user equipment may identify a cell group through the SSS, and may identify a cell within the cell group through the PSS.

Next, a type of a component carrier will be described. Examples of the type of the component carrier may include a backward compatible component carrier (hereinafter, referred to as "BC CC") and a non-backward compatible component carrier (hereinafter, referred to as "NBC CC").

The LTE Rel-8 system may support only single connection based downlink and uplink component carriers having default Tx-Rx separation, whereas the LTE-A system may support a broadband by aggregating component carriers, which satisfy default Tx-Rx separation, and component carriers, which fail to satisfy default Tx-Rx separation. The default Tx-Rx separation refers to an interval between a center frequency of a downlink carrier and a center frequency of an uplink carrier, which are defined in the LTE Rel-8 system.

The component carriers, which satisfy default Tx-Rx separation and support all the functions supported by the LTE Rel-8 system, structures of a physical channel and a physical signal and all the operations related to the structures, will be referred to as BC CC.

The component carriers, which satisfy default Tx-Rx separation and can be accessed by the LTE-A user equipment but can not be accessed by the LTE Rel-8 user equipment, belong to the NBC CC.

The component carriers, which fail to satisfy default Tx-Rx separation, may be defined as NBC CC, whereby the LTE Rel-8 user equipments may be configured so as not to camp on the NBC CC.

The BC CC may be accessed by all the user equipments of the LTE system, may be operated as a single carrier, and may be operated as a part of carrier aggregation. In the FDD system, the BC CC is always formed as a pair of downlink and uplink.

The NBC CC may be accessed by the LTE-A user equipment but cannot be accessed by the LTE Rel-8 user equipment.

A component carrier that may be operated as a single carrier will be referred to as a stand-alone component carrier. The stand-alone component carrier is the component carrier that enables all the operations of the user equipment such as access, camping, and transmission of control information, data and feedback information, through a pair of downlink and uplink only.

Next, a method for allocating a PCI to a component carrier will be described.

The system may be configured such that a plurality of component carriers aggregated during carrier aggregation use the same PCI or different PCIs. The plurality of component carriers which are aggregated refer to component carriers configured in one cell. If one CC corresponds to one cell, the embodiment of the present invention relates to a plurality of component carriers or cells configured by one global cell or base station.

If the aggregated component carriers use the same PCI, the user equipment may identify that the detected component carrier and the component carriers additionally allocated through dedicated signaling after RRC connection are those of the same cell, and may perform all the operations related to the PCI in the uplink component carrier of the corresponding cell by using the same PCI.

If the respective component carriers which are aggregated use their respective PCIS different from one another, it is advantageous in that network planning is easily performed. However, it may need to indicate that a plurality of component carriers used by the LTE-A user equipment are those of the same cell, and the PCI related operations of the uplink component carrier may be varied depending on connection between a downlink component carrier and an uplink component carrier. In other words, several PCI values of a downlink component carrier associated with one uplink component carrier may exist.

When the PCI is allocated, the same PCI may be allocated to the BC DL CCs and different PCIs may be allocated to the NBC DL CCs.

In the LTE Rel-8 system, one downlink component carrier and one uplink component carrier, which satisfy default Tx-Rx separation, constitute one cell and have one PCI. Operations related to DL/UL physical control/data channels, a physical signal, a reference signal (RS) sequence generation, scrambling code initialization, cyclic shift, root sequence selection, and hopping pattern generation are performed using one PCI.

Examples of the PCI related operations include PUSCH hopping function, PUCCH cyclic shift, PUCCH scrambling, UL RS group hopping, UL RS sequence hopping, demodulation (DM) RS generation, basic broadcast channel (PBCH) scrambling, PCFICH scrambling and resource mapping, PDCCH scrambling and resource mapping, PHICH scrambling and resource mapping, and downlink cell specific reference signal generation.

In the LTE Rel-8 system, since PCI related operations are performed based on PCI detected from the downlink component carriers connected at 1:1, ambiguousness or confusion of the PCI related operations does not occur. However, a problem, such as ambiguousness, interference and complexity of the PCI related operations, may occur depending on whether the plurality of component carriers aggregated during carrier aggregation use the same PCI and in accordance with connection relation between the downlink component carriers and the uplink component carriers.

Next, a method for transmitting control information in accordance with the embodiment of the present invention will be described.

In the embodiment of the present invention, it is assumed that a plurality of downlink component carriers respectively use their respective PCIs different from one another.

If ambiguousness occurs in the PCI related uplink operation depending on configuration and type of component carriers during carrier aggregation, and relation between the respective PCIs used respectively by the component carriers, the base station may transmit signaling for PCI to solve the ambiguousness. In other words, the base station may broadcast a specific PCI, which is a reference value, as cell-specific information, or may signal the specific PCI as user equipment-specific information. The user equipment may identify the reference PCI through detection.

At this time, the base station may transmit information on PCI to all the downlink component carriers. If a problem occurs in uplink operation, the base station may transmit the information on PCI to a specific component carrier to solve the problem. In case of carrier aggregation where BC CC and NBC CC coexist, the base station may signal PCI of the BC CC through the NBC CC so that the PCI of the BC CC may be used for efficient multiplexing with the LTE Rel-8 user equipments. Alternatively, the base station may signal PCI for use in the NBC CC through the BC CC.

The user equipment does not use the PCI, which is allocated to each of the downlink component carriers, for the uplink operation but performs the uplink operation by using the signaled PCI. In other words, the user equipment generates an uplink signal by using the signaled PCI and transmits the generated uplink signal to the base station. At this time, information on the transmitted PCI may include one or more of PCI to be used for actual uplink operation, offset between PCI to be used for actual uplink operation and PCI detected by the user equipment from a random component carrier, cell ID at a MAC layer, virtual PCI to be used for all the uplink carriers, virtual PCI to be used for NBC UL CC, and cell ID to be used by an uplink component carrier cell specifically connected with BC DL CC.

The aforementioned information on the PCI may be expressed and signaled by various methods such as downlink PCI and uplink cell ID. The information on the PCI may be defined as information signaled through a stand-alone downlink component carrier only. Alternatively, the information on the PCI may be transmitted from a designated specific downlink component carrier only. In this case, the designated specific downlink component carrier may be a cell-specific component carrier or a user equipment-specific component carrier. However, if the information on the PCI is transmitted as cell-specific information in accordance with a type of signaling, it may preferably be transmitted through the designated specific downlink component carrier but may be transmitted through a random user equipment specific component carrier.

In this case, for carrier connection of NBC CCs only, cell ID different from PCI may be defined. At this time, the cell ID may be used as an ID value constituting various physical channels separately from physical PCI in all the component carriers associated with the NBC CCs.

FIG. 7 is a diagram illustrating carrier aggregation where a downlink and an uplink are asymmetrical to each other.

In view of connection between downlink component carriers and uplink component carriers in carrier aggregation, there exists symmetrical carrier aggregation where downlink component carriers are mapped into uplink component carriers at 1:1 and asymmetrical carrier aggregation where downlink component carriers are not mapped into uplink component carrier at 1:1.

Downlink heavy asymmetrical carrier aggregation means that downlink component carriers are connected with uplink component carriers at n:1, and uplink heavy asymmetrical carrier aggregation means that downlink component carriers are connected with uplink component carriers at 1:n. FIG. 7(a) illustrates downlink heavy asymmetrical carrier aggregation, and FIG. 7(b) illustrates uplink heavy asymmetrical carrier aggregation.

Next, a method for transmitting control information in accordance with the embodiment of the present invention in case of symmetrical aggregation will be described.

FIG. 8 is a diagram illustrating a method for transmitting control information in accordance with the embodiment of the present invention in case of symmetrical carrier aggregation.

In case of symmetrical carrier aggregation, uplink operation is performed using PCI of downlink component carriers connected regardless of carrier type. However, as shown in FIG. 8(a), if a connection relation between downlink component carriers and uplink component carriers in case of cell-specific carrier configuration is different from a connection relation between downlink component carriers and uplink component carriers in case of user equipment specific carrier configuration of the LTE-A user equipment, a problem may occur in the uplink operation.

Under the circumstances shown in FIG. 8(a), LTE Rel-8 user equipments or LTE-A user equipments, which use cell specific connection relation, may exist in BC DL CC #0, and perform PCI related operations at UL CC #0 by using PCI A.

However, the LTE-A user equipment having a user equipment specific connection relation different from the cell specific connection relation performs PCI related operations at the UL CC #0 by using PCI B. In this case, backward compatibility with the LTE Rel-8 user equipments could not be maintained, and a problem occurs in all the PCI related operations at the UL CC #0.

FIG. 8(b) illustrates carrier aggregation among NBC CCs. In this case, if cell specific connection relation is set differently from user equipment specific connection relation, the problem described with reference to FIG. 8(a) may occur. In other words, if the user equipments that use cell specific connection relation and the user equipments that use user equipment connection relation coexist, the user equipments that use the cell specific connection relation will try to perform the PCI related operations at the UL CC #0 by using the PCI A, and the user equipments that use the user equipment connection relation will try to perform the PCI related operations at the UL CC #0.

As described above, the problem in the PCI related uplink operations, which is caused as the respective component carriers use their respective PCIs different from one another in symmetrical carrier aggregation, may be solved in such a manner that the base station signals information on PCI.

As shown in FIG. 8(a), if BC CC and NBC CC exist, the base station may signal information on PCI, which is to be used at UL CC #0, through the NBC CC. At this time, the base station may directly signal PCI A, and may transmit offset of PCI A and PCI B.

If the user equipment specific connection relation is varied semi-statically, the base station may transmit the information on PCI through user equipment specific RRC signaling, etc. If the user equipment specific connection relation is varied dynamically, the base station may transmit the information on PCI through L1/L2 control signaling or MAC message.

Next, a method for transmitting control information in accordance with the embodiment of the present invention in case of downlink heavy asymmetrical aggregation will be described.

FIG. 9 is a diagram illustrating a method for transmitting control information in accordance with the embodiment of the present invention in case of downlink heavy asymmetrical carrier aggregation.

In FIG. 9(a), if two downlink component carriers connected with one uplink component carrier use the same PCI, ambiguousness or confusion does not occur in PCI based operations in the uplink component carrier. However, if two downlink component carriers connected with one uplink component carrier use their respective PCIs different from each other, ambiguousness or confusion as to which PCI of downlink component carriers will be used for PCI based operations, occurs.

Accordingly, in order to solve ambiguousness, the base station notifies the user equipment of the information on PCI, which is used for uplink signal transmission. At this time, the information on PCI may be PCI used for uplink signal transmission, or may be offset between PCI used for uplink signal transmission and PCI detected by the user equipment.

Since no confusion occurs at the initial access step, the user equipment is typically operated. Then, the base station signals either a PCI value to be commonly used for uplink signal transmission or offset between the PCI value to be commonly used for uplink signal transmission and PCI currently used in the downlink component carrier, through RRC signaling.

FIG. 9(b) illustrates that offset is signaled.

It is assumed that PCI A and signature S1 are allocated to a downlink component carrier 0, and PCI B and signature S3 are allocated to a downlink component carrier 1. It is also assumed that an uplink component carrier 0 is operated by PCI C and that PCI and signature 1 are in a 1:1 relation.

If the base station signals offset between PCI C and PCI B to the user equipment through the downlink component carrier 1, the user equipment may perform uplink related operation by using PCI C. Alternatively, the base station may directly signal PCI C. If the PCI C used in the uplink component carrier 0 is the same as the PCI A, the base station may signal the PCI A at the downlink component carrier 1, or may signal offset between the PCI A and the PCI B at the downlink component carrier 1.

In FIG. 9(b), the base station may signal information on PCI of the BC CC to the user equipment through the NBC CC, so that the user equipment may perform uplink operation by using the PCI of the BC CC.

FIG. 9(c) illustrates carrier aggregation among NBC CCs. In case of carrier aggregation among NBC CC, although a problem related to backward compatibility with BC CCs does not occur, if the respective NBC CCs have their respective PCIs different from one another, ambiguousness as to which PCI is used in one uplink component carrier to perform uplink operation still exists.

In this case, it is preferable that a cell specific anchor component carrier is defined from aggregated NBC CCs and PCI related operations are performed in the uplink component carrier on the basis of PCI of the anchor component carrier. Accordingly, the base station transmits PCI of the anchor component carrier to the user equipment through a non-anchor component carrier or transmits offset between PCI of the non-anchor component carrier and PCI of the anchor component carrier to the user equipment.

In FIG. 9(c), in NBC DL CC 0 and NBC DL CC 1, if the NBC DL CC 0 is a cell specific anchor component carrier, the base station signals PCI A or offset between the PCI A and PCI B to the user equipment through the NBC DL CC 1, and the user equipment performs uplink operations at UL CC 0 by using the PCI 1.

Next, a method for transmitting control information in accordance with the embodiment of the present invention in case of uplink heavy asymmetrical aggregation will be described.

FIG. 10 is a diagram illustrating a method for transmitting control information in accordance with the embodiment of the present invention in case of uplink heavy asymmetrical carrier aggregation.

In case of uplink heavy asymmetrical carrier aggregation as shown in FIG. 10(a), since uplink operations are performed in two uplink component carriers on the basis of PCI detected from one downlink component carrier, confusion does not occur unlike downlink heavy asymmetrical carrier aggregation. However, since the uplink operations are performed in two uplink component carriers on the basis of the same PCI, a problem occurs in that PAPR is increased.

Accordingly, the base station signals information on PCI to be used for uplink operation in one of two uplink component carriers.

In FIG. 10(b), BC UL CC #0 that satisfies default Tx-Rx separation and NBC UL CC #1 that does not satisfy default Tx-Rx separation are connected with the BC DL CC #0. In this case, LTE Rel-8 user equipment or LTE-A user equipment, which uses BC DL CC #0 and BC UL CC #0, may exist, LTE-A user equipment configured by uplink heavy asymmetrical carrier aggregation may exist, and LTE-A user equipment, which uses BC DL CC #0 and NBC UL CC #1 only, may exist.

In such cases, the base station may signal PCI B to be used in the NBC UL CC #1 or offset between PCI A and PCI B to user equipments, which use BC DL CC #0 and NBC UL CC #1, and may lower PAPR if the user equipment performs uplink operation by using the PCI B. At this time, if the base station signals PCI B related information through the BC DL CC, it may transmit the information through LTE-A user equipment specific signaling.

As shown in FIG. 10(c), if uplink component carriers connected with a downlink component carrier are all the NBC CCs, a cell specific anchor uplink component carrier is set. The base station signals information on PCI so that the user equipment performs uplink operations in the cell specific anchor uplink component carrier by using PCI of the connected downlink component carrier, and performs uplink operations in a non-anchor uplink component carrier by using another PCI.

Figure 11:
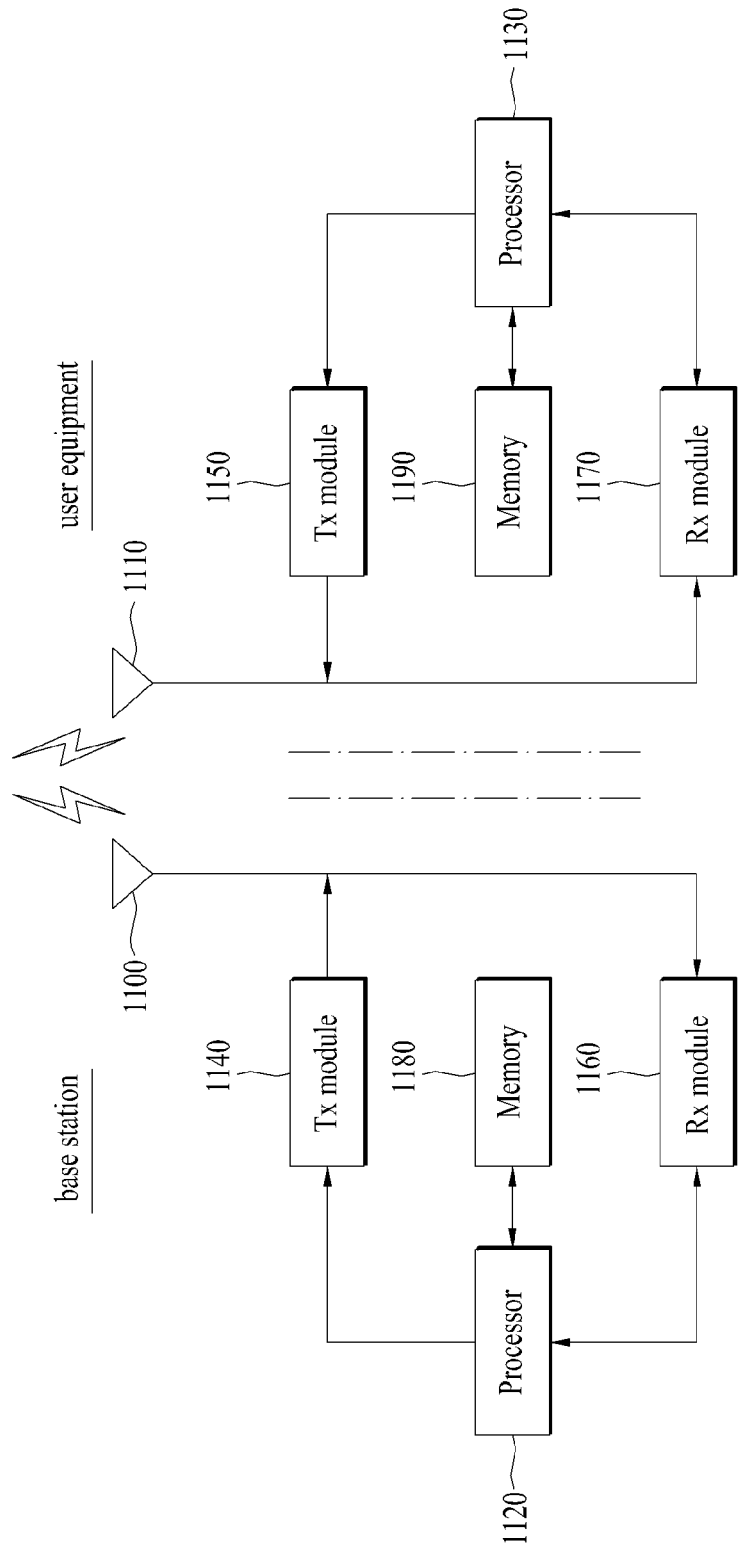
FIG. 11 is a diagram illustrating a configuration of a user equipment and a base station through which the embodiments of the present invention can be carried out, in accordance with another embodiment of the present invention.

FIG. 11 is a diagram illustrating a configuration of a user equipment and a base station, through which the aforementioned embodiments of the present invention can be carried out, in accordance with another embodiment of the present invention.

Each of the user equipment (AMS) and the base station (ABS) includes an antenna 1100, 1110 transmitting and receiving information, data, signal and/or message, a Tx module 1140, 1150 transmitting a message by controlling the antenna, an Rx module 1160, 1170 receiving the message by controlling the antenna, a memory 1180, 1190 storing information related to communication with the base station, and a processor 1120, 1130 controlling the Tx module, the Rx module, and the memory. At this time, the base station may be a femto base station or a macro base station.

The antenna 1100, 1110 serves to transmit a signal generated by the Tx module 1140, 1150 to the outside or receive a radio signal from the outside to transfer the radio signal to the Rx module 1160, 1170. If a MIMO antenna function is supported, two or more antennas may be provided.

The processor 1120, 1130 generally controls the whole operation of the user equipment or the base station. Particularly, the processor may perform a controller function for performing the aforementioned embodiments of the present invention, a medium access control (MAC) frame variable control function based on service characteristics and propagation condition, a handover function, an authentication and encryption function, etc. Also, the processor 1120, 1130 may further include an encryption module for controlling encryption of various messages and a timer module controlling transmission and reception of various messages.

The processor 1120 of the base station determines PCI to be used for uplink transmission of the user equipment.

The processor 1130 of the user equipment detects PCI through a downlink component carrier. And, the processor 1130 of the user equipment identifies PCI to be used for uplink transmission, from the PCI information received from the base station, and generates an uplink signal by using the identified PCI.

The PCI information received from the base station may be PCI allocated for uplink transmission from the base station, or may be offset PCI allocated for uplink transmission from the base station and PCI detected from the user equipment.

The Tx module 1140, 1150 may perform predetermined coding and modulation for signal and/or data, which are scheduled from the processor and then transmitted to the outside, and then may transfer the coded and modulated data to the antenna 1100, 1110.

The Tx module 1140 of the base station transmits information on PCI, which is to be used for uplink signal transmission, to the user equipment.

If non-backward compatible downlink component carrier (NBC DL CC) and backward compatible downlink component carrier (BC DL CC) are aggregated by carrier aggregation and are connected with one uplink component carrier, the Tx module 1140 of the base station may transmit information on PCI of the BC CC through the NBC CC. In other words, if the NBC DL CC and the BC DL CC are aggregated by carrier aggregation, the user equipment generates an uplink signal by using the PCI of the BC DL CC.

If non-backward compatible uplink component carrier (NBC UL CC) and backward compatible uplink component carrier (BC UL CC) are aggregated by carrier aggregation and are connected with one downlink component carrier, the Tx module 1140 of the base station may transmit information on PCI, which is to be used for uplink signal transmission of the user equipment from the NBC UL CC. In other words, the uplink signal to be transmitted from the BC UL CC by the user equipment is generated using PCI of the downlink component carrier connected with the NBC UL CC and the BC UL CC, and the uplink signal to be transmitted from the NBC UL CC is generated using PCI newly allocated from the base station.

The Tx module 1150 of the user equipment transmits the uplink signal, which is generated using the PCI received from the base station, to the base station.

The Rx module 1160, 1170 may perform decoding and demodulation for the radio signal received from the outside through the antenna 1100, 1110 to recover the original data and then transfer the recovered data to the processor 1120, 1130.

The Rx module 1160 of the base station receives the uplink signal, which is generated using PCI transmitted from the base station, from the user equipment.

The Rx module 1170 of the user equipment receives information on the PCI to be used for uplink signal transmission from the base station.

The memory 1180, 1190 may store a program for processing and control of the processor, or may perform a function for temporarily storing input/output data (in case of the user equipment, UL grant allocated from the base station, system information, station identifier (STID), flow identifier (FID), action time, zone allocation information, and frame offset information).

Also, the memory may include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for transmitting control information from a base station of a wireless communications system supporting carrier aggregation where non-backward compatible component carrier (NBC CC) and backward compatible component carrier (BC CC) coexist, the method comprising the steps of:

transmitting information on physical cell ID (physical cell identification or PCI) for use in uplink signal transmission, to a user equipment; and receiving an uplink signal, which is generated using the PCI, from the user equipment, wherein, if non-backward compatible downlink component carrier (NBC DL CC) and backward compatible downlink component carrier (BC DL CC) are aggregated by carrier aggregation and connected with one uplink component carrier (UL CC), the step of transmitting information on PCI includes transmitting information on PCI of the BC DL CC through the NBC DL CC, and the step of receiving an uplink signal includes receiving the uplink signal generated based on the PCI of the BC DL CC.

2. The method according to claim 1, wherein the information on PCI is an offset between the PCI for uplink signal transmission and a PCI detected by the user equipment.

3. The method according to claim 1, wherein, if non-backward compatible uplink component carrier (NBC UL CC) and backward compatible uplink component carrier (BC UL CC) are aggregated by carrier aggregation and connected with one downlink component carrier (DL CC), the step of transmitting information on PCI includes transmitting information on PCI for use in uplink signal transmission through the NBC UL CC.

4. A method for receiving control information from a user equipment of a wireless communications system supporting carrier aggregation where non-backward compatible component carrier (NBC CC) and backward compatible component carrier (BC CC) coexist, the method comprising the steps of:

receiving information on first PCI (physical cell identification) for use in uplink signal transmission, from a base station; and transmitting an uplink signal, which is generated using the first PCI, to the base station, wherein, if non-backward compatible downlink component carrier (NBC DL CC) and backward compatible downlink component carrier (BC DL CC) are aggregated by carrier aggregation and connected with one uplink component carrier (UL CC), the first PCI is a PCI of the BC DL CC.

5. The method according to claim 4, further comprising the step of detecting second PCI through a downlink component carrier, wherein the information on first PCI is an offset between the first PCI and the second PCI.

6. The method according to claim 4, wherein if NBC UL CC and BC UL CC are aggregated by carrier aggregation and connected with one downlink component carrier (DL CC), the first PCI is the PCI for use in uplink signal transmission when the user equipment transmits an uplink signal through the NBC UL CC.

7. A base station of a wireless communications system supporting carrier aggregation where non-backward compatible component carrier (NBC CC) and backward compatible component carrier (BC CC) coexist, the base station comprising:

a Tx module transmitting information on physical cell ID (physical cell identification or PCI) for use in uplink signal transmission, to a user equipment; and an Rx module receiving an uplink signal, which is generated using the PCI, from the user equipment, wherein, if non-backward compatible downlink component carrier (NBC DL CC) and backward compatible downlink component carrier (BC DL CC) are aggregated by carrier aggregation and connected with one uplink component carrier (UL CC), the Tx module transmits information on PCI of the BC CC through the NBC CC, and the Rx module receives the uplink signal, which is generated based on the PCI of the BC CC.

8. The base station according to claim 7, wherein the information on PCI is an offset between the PCI for uplink signal transmission and a PCI detected from by the user equipment.

9. The base station according to claim 7, wherein, if non-backward compatible uplink component carrier (NBC UL CC) and backward compatible uplink component carrier (BC UL CC) are aggregated by carrier aggregation and connected with one downlink component carrier (DL CC), the Tx module transmits information on PCI (physical cell identification) for use in uplink signal transmission when the user equipment transmits the uplink signal through the NBC UL CC.

10. A user equipment of a wireless communications system supporting carrier aggregation where non-backward compatible component carrier (NBC CC) and backward compatible component carrier (BC CC) coexist, the user equipment comprising:

an Rx module receiving information on first PCI for use in uplink signal transmission, from a base station; and a Tx module transmitting an uplink signal, which is generated using the first PCI, to the base station, wherein, if non-backward compatible downlink component carrier (NBC DL CC) and backward compatible downlink component carrier (BC DL CC) are aggregated by carrier aggregation and connected with one uplink component carrier (UL CC), the first PCI is a PCI of the BC DL CC.

11. The user equipment according to claim 10, further comprising a processor detecting second PCI through a downlink component carrier, wherein the information on first PCI is an offset between the first PCI and the second PCI.

12. The user equipment according to claim 10, wherein if NBC UL CC and BC UL CC are aggregated by carrier aggregation and connected with one downlink component carrier (DL CC), the first PCI is the PCI for use in uplink signal transmission when the user equipment transmits an uplink signal through the NBC UL CC.

* * * * *